US012666313B2

(12) United States Patent
Li et al.

(10) Patent No.: US 12,666,313 B2
(45) Date of Patent: Jun. 23, 2026

(54) METHOD AND DEVICE FOR RECOVERING CALL SERVICE IN A MOBILE COMMUNICATION SYSTEM

(71) Applicant: Samsung Electronics Co., Ltd., Suwon-si (KR)

(72) Inventors: Weibo Li, Guangdong (CN); Min Li, Guangdong (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 18/304,759

(22) Filed: Apr. 21, 2023

(65) Prior Publication Data

US 2023/0292187 A1 Sep. 14, 2023

Related U.S. Application Data

(63) Continuation of application No. PCT/KR2023/001629, filed on Feb. 6, 2023.

(30) Foreign Application Priority Data

Mar. 14, 2022 (CN) .......................... 202210248401.3

(51) Int. Cl.
*H04W 36/00* (2009.01)
*H04W 36/08* (2009.01)

(52) U.S. Cl.
CPC ........ *H04W 36/0019* (2023.05); *H04W 36/08* (2013.01)

(58) Field of Classification Search
CPC .......................... H04W 36/0019; H04W 36/08
See application file for complete search history.

(56) References Cited

U.S. PATENT DOCUMENTS 9,130,688 B2 9/2015 Yiu et al.
9,775,125 B1 * 9/2017 Vashi .................. H04W 60/005
(Continued)

FOREIGN PATENT DOCUMENTS

CN 113891410 A 1/2022
EP 2 848 039 11/2013
(Continued)

OTHER PUBLICATIONS

3GPP; 3rd Generation Partnership Project; Technical Specification Group Core Network and Terminals; Non-Access-Stratum (NAS) protocol for 5G System (5GS); Stage 3; (Release 17); 3GPP TS 24.501; V17.5.0; (Dec. 2021); Jan. 5, 2022; Valbonne, France.
(Continued)

*Primary Examiner* — Blake J Rubin
(74) *Attorney, Agent, or Firm* — Jefferson IP Law, LLP

(57) ABSTRACT

A method and a device for recovering a call service in a mobile communication system are provided. The method includes the following steps determining whether a second cell satisfies a condition for a terminal to perform an IP multimedia subsystem (IMS) registration when detecting that the terminal enters the second cell during a period in which the terminal waits for a next IMS registration due to an IMS registration failure in a first cell, initiating an initial IMS registration when determining that the second cell satisfies the condition, and recovering a call service of the terminal after the initial IMS registration is successful.

16 Claims, 11 Drawing Sheets determining whether a second cell satisfies a condition for a terminal to perform an IMS registration when detecting that the terminal enters the second cell during a period in which the terminal waits for a next IMS registratio due to the IMS registration failure in a first cell (S301)

↓ initiating an initial IMS registration whe determining that the second cell satisfies the registration condition (S302)

↓ recovering a call service of the terminal after the initial IMS registration is successful (S303)

(56)                    References Cited

U.S. PATENT DOCUMENTS

| | | | | |
|---|---|---|---|---|
| 10,219,144 B1 | 2/2019 | Rahman | | |
| 10,397,834 B2 | 8/2019 | Ye et al. | | |
| 11,997,748 B1* | 5/2024 | Kondeti | | H04W 8/04 |
| 2011/0002267 A1* | 1/2011 | Dwyer | | H04W 48/18 |
| | | | | 370/328 |
| 2018/0183839 A1* | 6/2018 | Chiang | | H04L 65/1069 |
| 2018/0248920 A1 | 8/2018 | Nomani et al. | | |
| 2019/0373515 A1* | 12/2019 | Balasubramanian | | |
| | | | | H04L 65/1016 |
| 2020/0153875 A1* | 5/2020 | Karampatsis | | H04L 65/1016 |
| 2020/0305019 A1* | 9/2020 | Karri | | H04L 65/1073 |
| 2021/0105691 A1 | 4/2021 | Zhu et al. | | |
| 2022/0201641 A1* | 6/2022 | Pattnaik | | H04L 65/1073 |
| 2022/0400360 A1* | 12/2022 | Chiang | | H04W 4/50 |
| 2023/0049004 A1* | 2/2023 | Kuppelur | | H04W 36/00226 |
| 2023/0156583 A1* | 5/2023 | Murray | | H04W 48/20 |
| | | | | 370/329 |
| 2023/0379368 A1* | 11/2023 | Yang | | H04L 65/1016 |
| 2024/0323804 A1* | 9/2024 | Wallentin | | H04W 48/02 |

FOREIGN PATENT DOCUMENTS

| | | |
|---|---|---|
| EP | 3 913 887 A1 | 11/2021 |
| JP | 5838008 B2 | 12/2015 |
| WO | 20215230 A1 | 10/2020 |
| WO | 2021/025432 A1 | 2/2021 |
| WO | 2021/232221 A1 | 11/2021 |

OTHER PUBLICATIONS

International Search Report with Written Opinion dated May 23, 2023; International Appln. No. PCT/KR2023/001629.

* cited by examiner

Time T1          Time T2

Period T

| The terminal fails to register in area A and does not receive a network response after the timeout | The terminal moves to area B and stops registering due to clock period, and waits for time T | The retry period T is reached, the terminal tries IMS registration, and the user can use high-definition calls after successful registration | determining whether a second cell satisfies a condition for a terminal to perform an IMS registration when detecting that the terminal enters the second cell during a period in which the terminal waits for a next IMS registratio due to the IMS registration failure in a first cell (S301)

Figure 3:
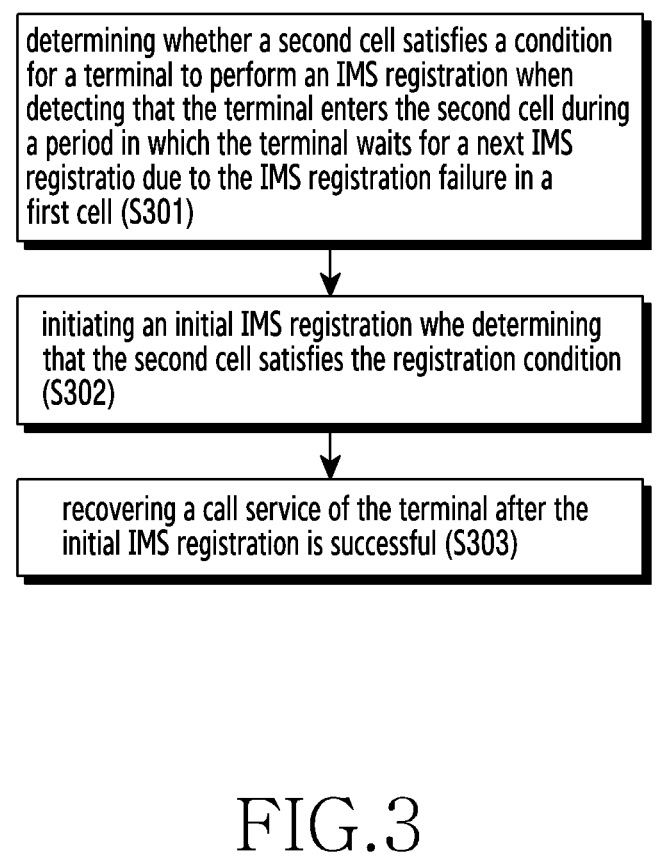

↓ initiating an initial IMS registration whe determining that the second cell satisfies the registration condition (S302)

↓ recovering a call service of the terminal after the initial IMS registration is successful (S303)

FIG.3 switching a current network mode of a terminal to a network mode that supports circuit switch fallback calls after the terminal determines that IMS registration failed for more than a preset time (S601)

Figure 6:
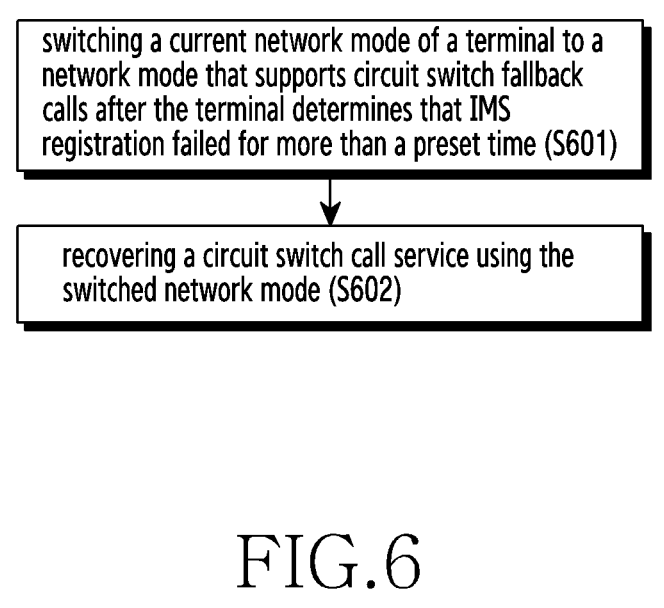

recovering a circuit switch call service using the switched network mode (S602)

Determination module 701

Call recovery module 702

Mode switching module 801

Call recovery module 802

FIG.8

METHOD AND DEVICE FOR RECOVERING CALL SERVICE IN A MOBILE COMMUNICATION SYSTEM

CROSS-REFERENCE TO RELATED APPLICATION(S)

This application is a continuation application, claiming priority under § 365(c), of an International application No. PCT/KR2023/001629, filed on Feb. 6, 2023, which is based on and claims the benefit of a Chinese patent application number 202210248401.3, filed on Mar. 14, 2022, in the Chinese Intellectual Property Office, the disclosure of which is incorporated by reference herein in its entirety.

TECHNICAL FIELD

The disclosure relates to the technical field of communications. More particularly, the disclosure relates to a method and device for recovering a call service for quickly recovering an internet protocol (IP) multimedia subsystem registration.

BACKGROUND

In the fifth generation (5G) communication era, terminal calls use the packet switch (PS) method based on IP multimedia subsystem (IMS). The terminal requires IMS re-registration in a certain period. In some areas, due to weak signal or other reasons, the terminal does not receive a network response during IMS re-registration, which results in the loss of IMS registration, and the terminal could not use high-definition voice calls. In addition, when the terminal moves to a strong signal area or the network which is suitable for IMS registration, the terminal stops registering because it is controlled by the re-registration timer and cannot immediately try to register or has tried all the proxy-call session control function (P-CSCF) address server lists. This results in the terminal not being able to recover high-definition voice calls quickly, which particularly affects the call experience of users using 5G standalone (SA).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for recovering a call service for quickly recovering an IMS registration.

Additional aspects will be set forth in part in the description which follows and, in part, will be apparent from the description, or may be learned by practice of the presented embodiments.

In accordance with an aspect of the disclosure, a method for recovering a call service is provided. The method includes determining whether a second cell satisfies a condition for a terminal to perform an IP multimedia subsystem (IMS) registration when detecting that the terminal enters the second cell during a period in which the terminal waits for a next IMS registration due to the IMS registration failure in a first cell, initiating an initial IMS registration when determining that the second cell satisfies the condition, and recovering a call service of the terminal after the initial IMS registration is successful.

As an example, the condition for the terminal to perform the IMS registration includes at least one of a network signal strength of the second cell being greater than a preset threshold, the second cell being a cell that has successfully registered with the IMS before, and a link connectivity with an IMS packet data network (PDN) being detected in the second cell.

As an example, the second cell is the cell that has successfully registered with the IMS before, the method includes pre-storing cell information of a cell that has successfully registered with the IMS before, comparing cell information of the second cell with the pre-stored cell information, determining that the second cell is the cell that has successfully registered with the IMS before when the cell information of the second cell matches the pre-stored cell information.

As an example, the link connectivity with the IMS packet data network (PDN) is detected in the second cell, the method includes sending a transmission control protocol (TCP) handshake packet to the PDN, and determining, upon receiving a response to the TCP handshake packet, that the link connectivity with the IMS PDN is detected in the second cell.

As an example, the initiating the initial IMS registration includes restarting a protocol stack of the terminal, re-camping on a network in the second cell, re-establishing the link connectivity with the IMS PDN, and initiating the initial IMS registration after successfully establishing the link connectivity with the IMS PDN.

As an example, the re-camping on the network in the second cell includes the terminal executing detaching and attaching operations of a wireless network in the second cell.

As an example, the re-camping on the network in the second cell includes the terminal executing deregistration and registration operations of a wireless network in the second cell.

As an example, the initiating the initial IMS registration includes re-establishing a link connectivity with an IMS PDN, and initiating the initial IMS registration after successfully establishing the link connectivity with the IMS PDN.

As an example, the re-establishing the link connectivity with the IMS PDN includes sending an activation request for re-establishing the link connectivity with the IMS PDN, and establishing the link connectivity with the IMS PDN successfully after receiving an activation response to the activation request.

As an example, the second cell is a different cell from the first cell.

In accordance with another aspect of the disclosure, a method for recovering a call service is provided. The method includes switching a current network mode of a terminal to a network mode that supports circuit switch fallback calls after the terminal determines that an IP multimedia subsystem (IMS) registration failed for more than a preset time, and recovering a circuit switch call service using the switched network mode.

As an example, in a case where the current network mode of the terminal is a standalone (SA) mode of the 5G network, the current network mode of the terminal may be switched to a non-standalone (NSA) mode of the 5G network.

In accordance with another aspect of the disclosure, a device for recovering a call service is provided. The device includes a determination module configured to determine whether a second cell satisfies a condition for a terminal to perform an IP multimedia subsystem (IMS) registration when detecting that the terminal enters the second cell during a period in which the terminal waits for a next IMS registration due to an IMS registration failure in a first cell, and a call recovery module configured to initiate an initial IMS registration when determining that the second cell satisfies the condition, and recover a call service of the terminal after the initial IMS registration is successful.

As an example, the condition for the terminal to perform the IMS registration includes at least one of a network signal strength of the second cell being greater than a preset threshold, the second cell being a cell that has successfully registered with the IMS before, and a link connectivity with an IMS packet data network (PDN) being detected in the second cell.

As an example, the determination module may be configured to pre-store cell information of the cell that has successfully registered with the IMS before, compare cell information of the second cell with the pre-stored cell information, determine that the second cell is the cell that has successfully registered with the IMS before when the cell information of the second cell matches the pre-stored cell information.

As an example, the determination module may be configured to send a transmission control protocol (TCP) handshake packet to the PDN, and determine, upon receiving a response to the TCP handshake packet, that the link connectivity with the IMS packet data network (PDN) is detected in the second cell.

As an example, the call recovery module may be configured to restart a protocol stack of the terminal, re-camp on a network in the second cell, re-establish the link connectivity with the IMS PDN, and initiate the initial IMS registration after successfully establishing the link connectivity with the IMS PDN.

As an example, the call recovery module may be configured to control the terminal to execute detaching and attaching operations of a wireless network in the second cell.

As an example, the call recovery module may be configured to control the terminal to execute deregistration and registration operations of a wireless network in the second cell.

As an example, the call recovery module may be configured to re-establish the link connectivity with the IMS PDN, and initiate the initial IMS registration after successfully establishing the link connectivity with the IMS PDN.

As an example, the call recovery module may be configured to send an activation request for re-establishing the link connectivity with the IMS PDN, and establish the link connectivity with the IMS PDN successfully after receiving an activation response to the activation request.

As an example, the second cell is a different cell from the first cell.

In accordance with another aspect of the disclosure, a device for recovering a call service is provided. The device includes a mode switching module configured to switch a current network mode of a terminal to a network mode that supports circuit switch fallback calls after the terminal determines that an IP multimedia subsystem (IMS) registration failed for more than a preset time, and a call recovery module configured to recover a circuit switch call service using the switched network mode.

As an example, in a case where the current network mode of the terminal is a standalone (SA) mode of the 5G network, the mode switching module may be configured to switch the current network mode of the terminal to a non-standalone (NSA) mode of the 5G network.

In accordance with another aspect of the disclosure, at least one non-transitory computer-readable storage medium having stored thereon instructions which, when executed by at least one processor, implement a method for recovering a call service is provided.

In accordance with another aspect of the disclosure, a computing device is provided. The computing device includes at least one processor, and a memory stored with instructions which, when being executed by the at least one processor, cause the at least one processor to implement a method for recovering a call service.

In accordance with another aspect of the disclosure, a computer program product in which instructions are run by at least one processor in an electronic device to execute a method for recovering a call service is provided.

The disclosure can quickly recover the high-definition voice call service after the terminal registration fails, thereby improving the user experience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 3 is a flowchart of a method for recovering a call service according to an embodiment of the disclosure;

FIG. 6 is a flowchart of a method for recovering a call service according to an embodiment of the disclosure;

FIG. 7 is a block diagram of a device for recovering a call service according to an embodiment of the disclosure;

FIG. 8 is a block diagram of a device for recovering a call service according to an embodiment of the disclosure;

Throughout the drawings, it should be noted that like reference numbers are used to depict the same or similar elements, features, and structures.

DETAILED DESCRIPTION

Figure 1:
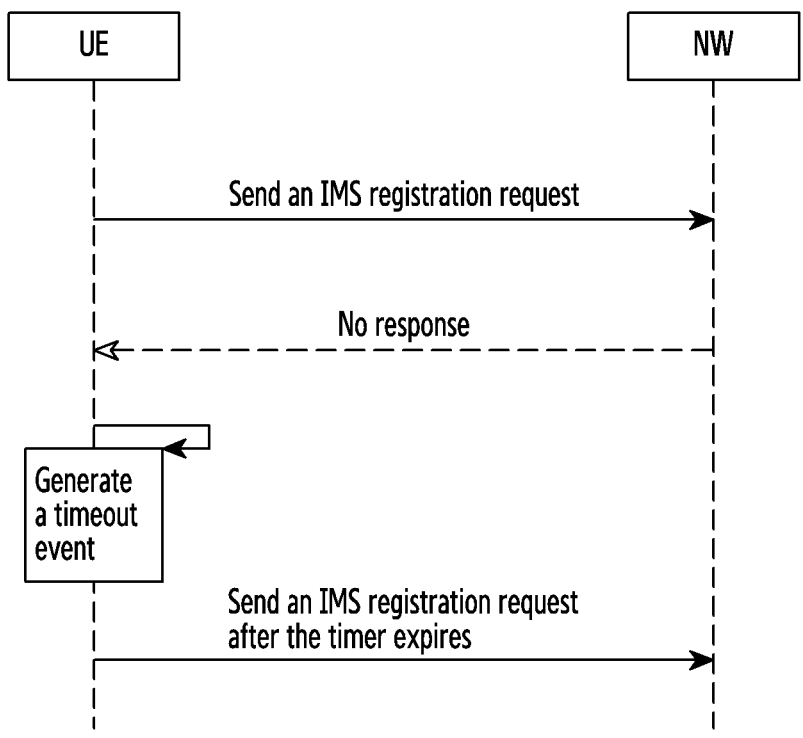
FIG. 1 is a flow diagram of a terminal waiting for a next re-registration when a registration network does not respond according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprising" "including" and "having" refer to the presence of the stated features, quantities, operations, components, elements, and/or combinations thereof, but do not exclude the presence or addition of one or more other features, quantities, operations, components, elements, and/or combinations thereof.

Unless otherwise defined, entire terms used herein (including technical terms and scientific terms) have the same meanings as would normally be understood by those of ordinary skill in the art to which the disclosure pertains upon understanding the disclosure. Unless expressly defined herein, terms (such as those defined in a generic dictionary) should be construed to have meanings consistent with their meanings in the context of the related art and in the disclosure, and should not be idealized or overly formalized.

It should be noted that the terms "first", "second" and the like in the description and claims as well as the above drawings of the disclosure are used to distinguish similar objects and are not necessarily used to describe a specific order or sequence. It should be understood that the data used in this way may be interchanged under appropriate circumstances, so that the embodiments of the disclosure described herein can be implemented in an order other than those illustrated or described herein. The embodiments described in the following embodiments are not representative of all embodiments consistent with the disclosure. Rather, they are only examples of devices and methods consistent with some aspects of the disclosure as detailed in the appended claims.

Further, in the description of the examples, the detailed description of a well-known related structure or function will be omitted when it is considered that such detailed description will give rise to an ambiguous interpretation of the disclosure.

In the related art, assuming that a terminal tries to perform IMS re-registration due to the expiration of the re-registration period in an area A and does not receive a registration response from a network due to weak network signals or other reasons, the terminal generates a 708 registration timeout event. The terminal will try to a next registration according to the time period (referred to as period T) of RFC 5626 (standard specification document). As the number of re-registration failures increases, the period of the re-registration interval becomes longer. When the registration fails more than 5 times, the next re-registration period reaches 30 minutes. In other words, the longest re-registration period will reach 30 minutes.

FIG. 1 illustrates a flow diagram of a terminal waiting for a next re-registration when a registration network does not respond according to an embodiment of the disclosure.

Referring to FIG. 1, a user equipment (UE) sends an IMS registration request to a network (NW). After the UE does not receive a response from the NW, the UE generates a 708 timeout event, resulting in the UE having to wait for a period T before sending a registration request to the network. As the number of registration failures increases, the waiting period becomes longer.

The definition of a waiting time W for a next registration after a registration timeout fails in RFC 5626 is as follows:

wait time (W)

$$W=\min\ (\text{max-time},(\text{base-time}*(2^{\text{consecutive-failures}})))$$

These times MAY be configurable in the UA. The three times are:

max-time with a default of 1800 seconds
base-time (if all failed) with a default of 30 seconds
base-time (if all have not failed) with a default of 90 seconds When the terminal fails to re-register in the area A, it enters the waiting period, at this time, even if the terminal moves to an area B where there is a strong signal or the network is suitable for IMS registration, the terminal still has to wait for the re-registration period T to expire before re-registering with the IMS. For example, the terminal may need to wait nearly 30 minutes before re-registering with the IMS, which is not conducive for users to quickly resume the function of using the high-definition (HD) voice calls. The operation of the terminal moving to the area B during a retry registration period T after the terminal fails to register in the area A is shown in FIG. 2.

Figure 2:
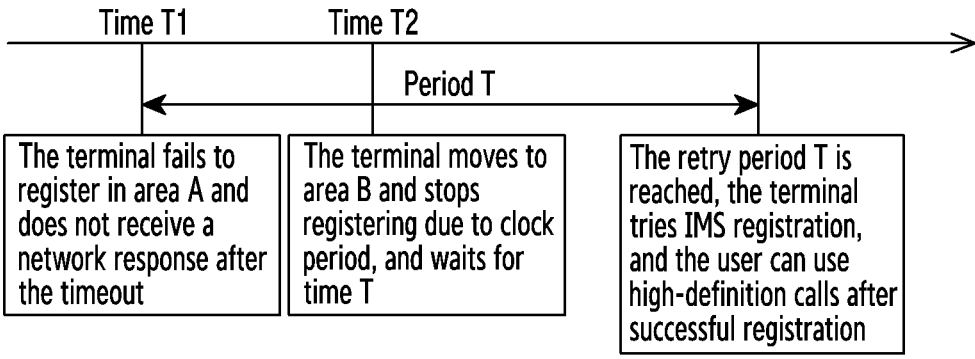
FIG. 2 is a schematic diagram of an operation of a terminal moving to an area B during a retry registration period T after the terminal fails to register in an area A according to an embodiment of the disclosure.

FIG. 2 is a schematic diagram of an operation of a terminal moving to an area B during a retry registration period T after the terminal fails to register in an area A according to an embodiment of the disclosure.

Referring to FIG. 2, based on the above problems, the disclosure proposes a solution of recovering a call service for quickly recovering an IMS registration. Hereinafter, various embodiments of the disclosure will be described with reference to the accompanying drawings. However, embodiments may be implemented in various forms and are not limited to the examples described herein.

FIG. 3 illustrates a flowchart of a method for recovering a call service according to an embodiment of the disclosure. The method shown in FIG. 1 can be applied to any electronic apparatus with communication capability. The electronic device may include, for example, but not limited to, a portable communication apparatus (e.g., a smart phone), a computer apparatus, a portable multimedia apparatus, a portable medical apparatus, a camera, a wearable apparatus, and the like. According to the embodiment of the disclosure, the electronic apparatus is not limited to the above.

Referring to FIG. 3, in operation 301, whether a second cell satisfies a condition for a terminal to perform an IP multimedia subsystem (IMS) registration is determined when detecting that the terminal enters the second cell during a period in which the terminal waits for a next IMS registration due to an IMS registration failure in a first cell. The first cell and the second cell may be the same cell or different cells.

The terminal is disconnected IMS PDN in the cell (usually caused by the network) or the user switches the flight mode such that the terminal is triggered for the initial registration, or the re-registration timer period (wherein the re-registration timer period is issued by the network, and the terminal also has a default value) expires such that the terminal is triggered for the re-registration (such as IMS registration). For example, when IMS registration is performed in the case of weak signal in the cell A or abnormal link due to other reasons, according to third generation partnership project (3GPP) TS24.229 specification, if the terminal does not receive a response within a certain period of time, a timeout event will be generated, and the terminal will enter a waiting period T to wait for the next re-registration.

When it is detected that the terminal is in a period of waiting for the next IMS registration, if the terminal moves to a second cell, for example, from the cell A to the cell B, the terminal may determine whether the cell B satisfies the condition for performing the IMS registration.

As an example, the condition for the terminal to perform the IMS registration may include at least one of a network signal strength of the second cell being greater than a preset threshold, such as a reference signal receiving power or reference signal reception quality of the cell B is greater than a certain threshold (this threshold can be preset by a test experiment), the second cell being a cell that has successfully registered with the IMS before, such as the last high-definition voice registration in cell B was successful, and a link connectivity with an IMS PDN being detected in the second cell, such as detecting the link connectivity after sending a transmission control protocol (TCP) handshake packet to the network in the cell B. When the terminal satisfies any one of the above conditions, the protocol stack can be restarted silently without user's perception immediately.

For example, cell information of the second cell may be compared with stored cell information, and when the cell information of the second cell matches the stored cell information, it is determined that the second cell satisfies the condition for the terminal to perform the IMS registration. As another example, the TCP handshake packet may be sent to the PDN, and when a response to the TCP handshake packet is received, it is determined that the second cell satisfies the condition for the terminal to perform the IMS registration.

In the disclosure, the information referred to in the above conditions may be stored in advance. For example, each time the terminal successfully registers with a cell that implements the high-definition voice call, the terminal records tracking area code (TAC) and communication identifier (CID) information of the cell, such as a tracking area identifier, cell identifier, and the like. The cell information TAC and CID for the terminal successfully registering IMS can be recorded in a database table. If the IMS registration fails, the record information (i.e., TAC and CID information) of the corresponding cell will be deleted from the database.

For example, the cell information of successfully registering IMS is stored in the form of the following table.

| TAC | CID |
|------|-----|
| 1234 | 123 |

Since the terminal has recorded the TAC and CID of the cell successfully registered with the IMS, it is possible to find out whether the TAC and CID of the newly moved second cell exist in the database table of the cell information stored in the terminal. If any, the cell is considered to be the last cell successfully registered with the high-definition voice.

In operation 302, when it is determined that the second cell satisfies the registration condition, an initial IMS registration is initiated.

As an example, the terminal may restart the protocol stack of the terminal, re-camp on the network in the second cell, and re-establish the link connectivity with the IMS PDN. After successfully establishing the link connectivity with the IMS PDN, the terminal may initiate the initial IMS registration.

Assuming that the terminal uses the fourth generation (4G) network, the terminal can execute detaching and attaching operations of a wireless network in the second cell when re-camping on the network in the second cell.

Assuming that the terminal uses the 5G network, the terminal can execute deregistration and registration operations of a wireless network in the second cell when re-camping on the network in the second cell.

Upon re-establishing the link connectivity with the IMS PDN, the terminal may send an activation request for re-establishing the link connectivity with the IMS PDN, and upon receiving an activation response to the activation request, it indicates that the terminal has successfully established the link connectivity with the IMS PDN.

Figure 4:
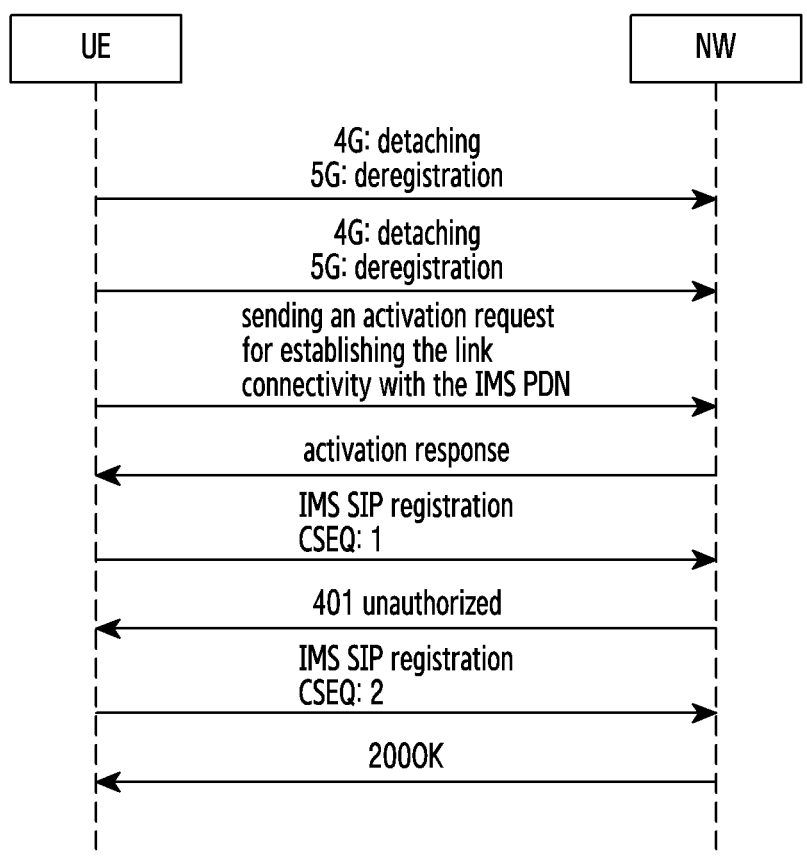
FIG. 4 illustrates a schematic diagram of a process of terminal and network interaction according to an embodiment of the disclosure.

FIG. 4 illustrates a schematic diagram of a process of terminal and network interaction according to an embodiment of the disclosure. FIG. 4 illustrates the process of terminal and network interaction after silent restart.

Referring to FIG. 4, under the 4G network, a UE may execute detaching and attaching operations of the wireless network, and under the 5G network, the UE may execute deregistration and a registration operations of the wireless network. The UE then sends the activation request to the NW for re-establishing the link connectivity with the IMS PDN, and after the UE receives the activation response to the activation request, the link connectivity of the IMS PDN is established between the UE and the NW. Later, the UE executes initial registration of the NW.

As another example, the terminal may re-establish the link connectivity with the IMS PDN in the case of determining that the second cell satisfies the registration condition, and initiate the initial IMS registration after successfully establishing the link connectivity with the IMS PDN. For example, the terminal may immediately reconnect the IMS PDN without the user's perception, i.e., the terminal disconnects and re-requests establishment of the IMS PDN. After the terminal re-establishes the IMS PDN, it can initiate the initial IMS registration.

In addition, when it is determined that the second cell does not satisfy the registration condition, the terminal can continue to wait for the timer period to expire according to the original protocol before triggering the registration.

According to the embodiments of the disclosure, when the first cell and the second cell are the same or different, the electronic apparatus is in a period waiting for the next IMS registration, and if any of the above conditions is satisfied, the initial IMS registration may be initiated directly without waiting for the period to expire.

In operation 303, a call service of the terminal is recovered after the initial IMS registration is successful. After successful registration of the IMS, the terminal can quickly recover the high-definition call function.

As an example, it is assumed that the terminal moves to an area B during the waiting period T of the next re-registration after failing to re-register in area A at a time T1. When the terminal detects the TAC and CID of the cell having successfully registered with the IMS in the area B, or is connected through TCP sync detection signal link, or the signal strength of the 4G or 5G network is greater than a certain threshold at a time T2, the protocol stack can be silently restarted immediately (without the user's perception) without waiting for the time to reach the period T, and the initial IMS registration can be initiated after the terminal is camped on the network, thereby quickly recovering the high-definition voice call service, as shown in FIG. 5.

Figure 5:
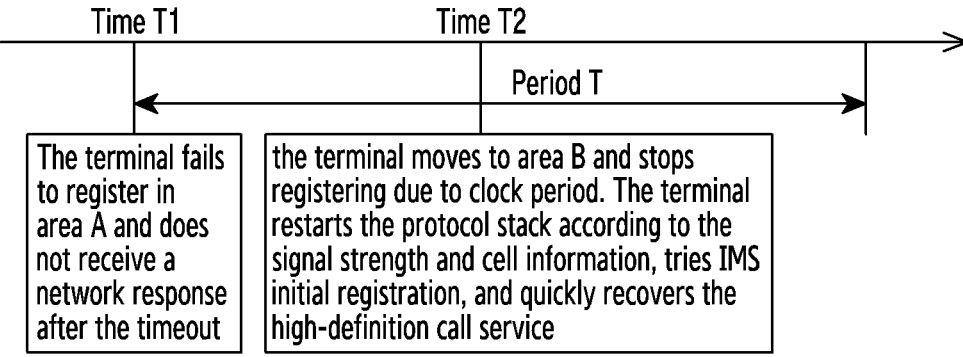
FIG. 5 is a schematic diagram of an operation of a terminal moving to an area B during a retry registration period T after the terminal fails to register in an area A according to an embodiment of the disclosure.

FIG. 5 is a schematic diagram of an operation of a terminal moving to an area B during a retry registration period T after the terminal fails to register in an area A according to an embodiment of the disclosure.

FIG. 6 illustrates a flowchart of a method for recovering a call service according to an embodiment of the disclosure.

Referring to FIGS. 5 and 6, in operation 601, after a terminal determines that the IMS registration failure exceeds a preset time, a current network mode of the terminal is switched to a network mode that supports circuit switch fallback calls.

For example, in a case where the current network mode of the terminal is a standalone (SA) mode of the 5G network, the current network mode of the terminal can be switched to a non-standalone (NSA) mode of the 5G network.

In operation 602, a circuit switch call service is recovered using the switched network mode.

When the terminal discovers that the IMS registration has been lost for more than a certain time Q (Q>=0), the network mode of the terminal can be switched to the network mode that supports circuit switch (CS) fallback calls, for example, from 5G SA mode to NSA mode. If an original network mode already supports the CS fallback calls (such as 4G network or 5G NSA mode), there is no need to switch it. In this way, the circuit switch call service can be quickly recovered for users.

Figure 7:
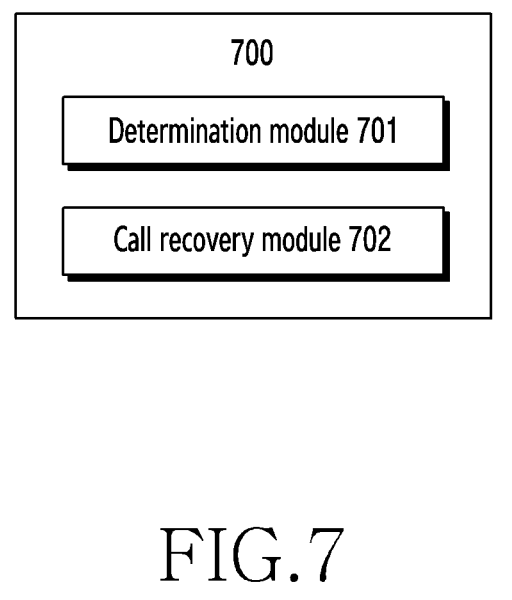

FIG. 7 is a block diagram of a device for recovering a call service according to an embodiment of the disclosure.

Referring to FIG. 7, a device 700 for recovering a call service may include a determination module 701 and a call recovery module 702. Each module in the device 700 for recovering the call service may be implemented by one or more modules, and the name of the corresponding module may vary according to the type of module. In various embodiments of the disclosure, some modules in the device 700 for recovering the call service may be omitted or additional modules may be included. Further, the modules/elements according to various embodiments of the disclosure may be combined to form a single entity, and thus the functions of the respective modules/elements prior to the combination may be equivalently performed.

The device 700 for recovering the call service may be a component of an electronic apparatus or as a separate device.

The determination module 701 may determine whether a second cell satisfies a condition for a terminal to perform an IP multimedia subsystem (IMS) registration when detecting that the terminal enters the second cell during a period in which the terminal waits for a next IMS registration due to an IMS registration failure in a first cell.

As an example, the second cell may be the same cell as the first cell or a cell different from the first cell.

The call recovery module 702 may initiate an initial IMS registration when determining that the second cell satisfies the condition, and recover a call service of the terminal after the initial IMS registration is successful.

As an example, the condition for the terminal to perform the IMS registration may include at least one of a network signal strength of the second cell being greater than a preset threshold, the second cell being a cell that has successfully registered with the IMS before, and a link connectivity with an IMS packet data network (PDN) being detected in the second cell.

As an example, when the condition for the terminal to perform an IMS registration includes that the second cell is a cell that has successfully registered with the IMS before, the determination module 701 may pre-store cell information of a cell that has successfully registered with the IMS before, compare cell information of the second cell with the pre-stored cell information, and determine that the second cell satisfies the condition for the terminal to perform the IMS registration when the cell information of the second cell matches the pre-stored cell information.

As an example, when the condition for the terminal to perform the IMS registration includes that a link connectivity with an IMS PDN is detected in the second cell, the determination module 701 may send a transmission control protocol (TCP) handshake packet to the IMS PDN, and determine that the second cell satisfies the condition for the terminal to perform the IMS registration upon receiving a response to the TCP handshake packet.

As an example, the call recovery module 702 may restart a protocol stack of the terminal, re-camp on a network in the second cell; re-establish the link connectivity with the IMS PDN, and initiate the initial IMS registration after successfully establishing the link connectivity with the IMS PDN.

As an example, the call recovery module 702 may control the terminal to execute detaching and attaching operations of a wireless network in the second cell.

As an example, the call recovery module 702 may control the terminal to execute deregistration and registration operations of a wireless network in the second cell.

As an example, the call recovery module 702 may re-establish a link connectivity with an IMS PDN, and initiate the initial IMS registration after successfully establishing the link connectivity with the IMS PDN.

As an example, the call recovery module 702 may send an activation request for re-establishing the link connectivity with the IMS PDN, and establish the link connectivity with the IMS PDN successfully after receiving an activation response to the activation request.

The method for recovering calls has been described above with respect to FIGS. 3 to 5, and will not be repeated here.

Figure 8:
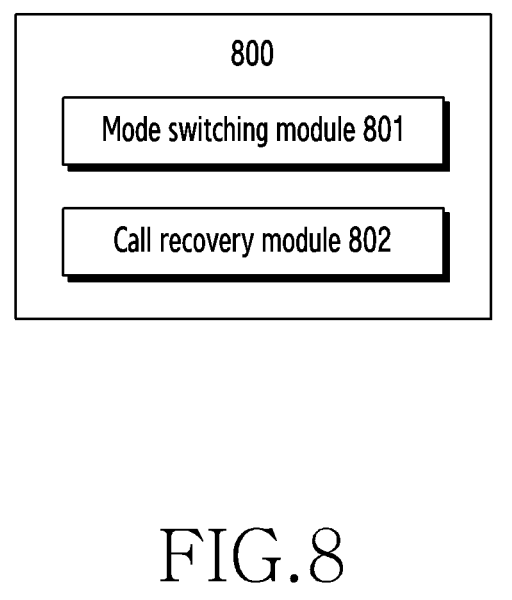

FIG. 8 is a block diagram of a device for recovering a call service according to an embodiment of the disclosure.

Referring to FIG. 8, a device 800 for recovering call service may include a mode switching module 801 and a call recovery module 802. Each module in the device 800 for recovering the call service may be implemented by one or more modules, and the name of the corresponding module may vary according to the type of module. In various embodiments of the disclosure, some modules in the device 800 for recovering the call service may be omitted or additional modules may be included. Further, the modules/elements according to various embodiments of the disclosure may be combined to form a single entity, and thus the functions of the respective modules/elements prior to the combination may be equivalently performed.

The device 800 for recovering the call service may be a component of an electronic apparatus or as a separate device.

The mode switching module 801 may switch a current network mode of a terminal to a network mode that supports circuit switch fallback calls after the terminal determines that an IP multimedia subsystem (IMS) registration failed for more than a preset time.

The call recovery module 802 may recover a circuit switch call service using the switched network mode.

As an example, in a case where the current network mode of the terminal is a standalone (SA) mode of the 5G network, the mode switching module 801 may switch the current network mode of the terminal to a non-standalone (NSA) mode of the 5G network.

The process of recovering calls has been described above with respect to FIG. 6, and will not be repeated here.

Figure 9:
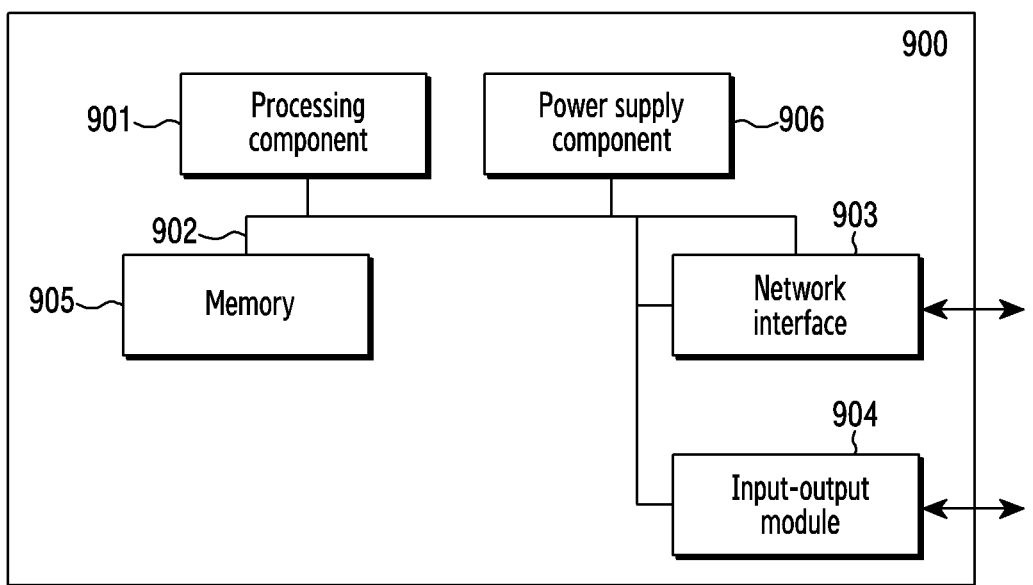
FIG. 9 illustrates a schematic structural diagram of an electronic apparatus according to an embodiment of the disclosure.

FIG. 9 illustrates a schematic structural diagram of an electronic apparatus according to an embodiment of the disclosure. The electronic apparatus of FIG. 9 can quickly recover the high-definition voice call service. In various embodiments of the disclosure, the electronic apparatus may include, for example, but not limited to, a portable communication device (e.g., a smart phone), a computer device, a portable multimedia device, a portable medical device, a camera, a wearable device, and the like. According to the embodiment of the disclosure, the electronic apparatus is not limited to the above.

Referring to FIG. 9, an electronic apparatus 900 may include a processing component 901, a communication bus 902, a network interface 903, an input-output interface 904, a memory 905 and a power supply component 906. The communication bus 902 serves to realize connection communication between these components. The input-output interface 904 may include a video display (such as a liquid crystal display), a microphone and speaker, and a user interaction interface (such as a keyboard, mouse, touch input device, or the like), and optionally, the input-output interface 904 may also include a standard wired interface, a wireless interface. The network interface 903 may optionally include a standard wired interface and a wireless interface (e.g., a wireless fidelity interface). The memory 905 may be a high-speed random access memory or a stable non-volatile memory. The memory 905 may optionally be a storage device independent of the aforementioned processing component 901.

Those skilled in the art will appreciate that the configuration shown in FIG. 9 does not constitute a limitation to the electronic apparatus 900 and may include more or fewer components than illustrated or a combination of certain components or different component arrangements.

As shown in FIG. 9, the memory 905, as a storage medium, may include an operating system, a data storage module, a network communication module, a user interface module, a program for recovering a call service and a database.

In the electronic apparatus 900 shown in FIG. 9, the network interface 903 is mainly used for data communication with external apparatuses/terminals. The input-output interface 904 is mainly used for data interaction with users. The processing component 901 and the memory 905 in the electronic apparatus 900 may be provided in the electronic apparatus 900, and the electronic apparatus 900 executes the method for recovering the call service provided by the embodiment of the disclosure by calling programs stored in the memory 905 and various APIs provided by the operating system through the processing component 901.

The processing component 901 may include at least one processor, and the memory 905 stores a set of computer-executable instructions that, when being executed by the at least one processor, execute a method for data recovery call service according to the embodiments of the disclosure. In addition the processing component 901 may perform an encoding operation, a decoding operation and the like. However, the above examples are only exemplary and the disclosure is not limited thereto.

Figure 10:
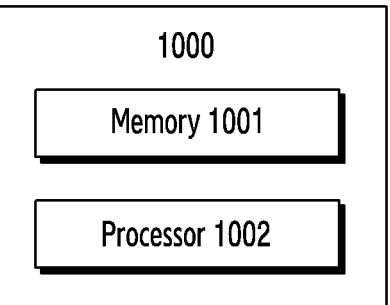
FIG. 10 illustrates a schematic diagram of a computing device according to an embodiment of the disclosure.

FIG. 10 illustrates a schematic diagram of a computing device according to an embodiment of the disclosure.

Referring to FIG. 10, a computing device 1000 according to an embodiment of the disclosure includes a memory 1001 and a processor 1002, a computer program is stored on the memory 1001, and the processor 1002 implements a method for recovering a call service according to the embodiment of the disclosure when the computer program is executed by the processor 1002.

As an example, the method for recovering the call service of the disclosure may be implemented when the computer program is executed by the processor 1002.

Computing devices in embodiments of the disclosure may include, but are not limited to, devices such as mobile phones, notebook computers, personal digital assistants (PDAs), personal application devices (PADs) (tablet computers), desktop computers, and the like. The computing device shown in FIG. 10 is only one example and should not impose any limitation on the functionality and scope of use of the embodiments of the disclosure.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software including one or more instructions that are stored in a storage medium that is readable by a machine (e.g., a mobile device). For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disk-read only memory (CD-ROM)), or be distributed (e.g., downloaded or uploaded) online via an application store (e.g., Play Store™), or be distributed (e.g., downloaded or uploaded) between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities (for example, in FIG. 10, the memory 1001 may include one or more memories, and the processor 1002 may include one or more processors). According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 11:
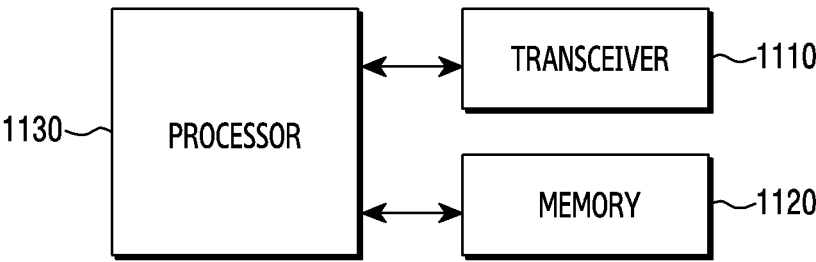
FIG. 11 illustrates a structure of an electronic apparatus according to an embodiment of the disclosure.

FIG. 11 illustrates a structure of an electronic apparatus according to an embodiment of the disclosure.

Referring to FIG. 11, the electronic apparatus according to an embodiment may include a transceiver 1110, a memory 1120, and a processor 1130. The transceiver 1110, the memory 1120, and the processor 1130 of the electronic apparatus may operate according to a communication method of the electronic apparatus described above. However, the components of the electronic apparatus are not limited thereto. For example, the electronic apparatus may include more or fewer components than those described above. In addition, the processor 1130, the transceiver 1110, and the memory 1120 may be implemented as a single chip. Also, the processor 1130 may include at least one processor. Furthermore, the electronic apparatus of FIG. 11 corresponds to the electronic apparatus of the FIG. 9.

The transceiver 1110 collectively refers to an electronic apparatus receiver and an electronic apparatus transmitter, and may transmit/receive a signal to/from a base station or a network entity. The signal transmitted or received to or from the base station or a network entity may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the electronic apparatus. Also, the memory 1120 may store control information or data included in a signal obtained by the electronic apparatus. The memory 1120 may be a storage medium, such as a read-only memory (ROM), a random access memory (RAM), a hard disk, a CD-ROM, and a digital versatile disc (DVD), or a combination of storage media.

The processor 1130 may control a series of processes such that the electronic apparatus operates as described above.

For example, the transceiver 1110 may receive a data signal including a control signal transmitted by the base station or the network entity, and the processor 1130 may determine a result of receiving the control signal and the data signal transmitted by the base station or the network entity.

At least one of the plurality of modules can be implemented by an AI model. Functions associated with the AI may be performed through a non-volatile memory, a volatile memory, and a processor.

The processor may include one or more processors. In this case, one or more processors may be general purpose processors, such as a central processing unit (CPU), an application processor (AP), or the like, a graphics-only processor (such as a graphics processor (GPU), a vision processor (VPU), and/or an AI-specific processor (such as a neural processing unit (NPU)).

One or more processors control processing of input data in accordance with predefined operating rules or artificial intelligence (AI) models stored in the nonvolatile memory and the volatile memory. The predefined operating rules or artificial intelligence models can be provided by training or learning. Here, providing by learning means forming a predefined operating rule or AI model with desired characteristics by applying a learning algorithm to a plurality of learning data. Learning may be executed in the device executing the AI according to the embodiment itself and/or may be accomplished by a separate server/apparatus/system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   identifying a failure of a registration of an IP multimedia subsystem (IMS) in a first cell;
   identifying a second cell satisfies a condition for the registration of the IMS before a waiting time for a next registration of the IMS expires, wherein the waiting time starts due to the failure;
   initiating an initial registration of the IMS in a second cell before the waiting time for the next registration of the IMS expires; and
   recovering a call service of the UE after the initial registration of the IMS is successful.

2. The method of claim 1, wherein the condition for the registration of the IMS comprises at least one of:
   a network signal strength of the second cell being greater than a preset threshold;
   the second cell being a cell that has successfully registered with the IMS before; or
   a link connectivity with an IMS packet data network (PDN) being detected in the second cell.

3. The method of claim 2, wherein the second cell is the cell that has successfully registered with the IMS before, the method comprises:
   pre-storing cell information of a cell that has successfully registered with the IMS before;
   comparing cell information of the second cell with the pre-stored cell information; and
   determining that the second cell is the cell that has successfully registered with the IMS before when the cell information of the second cell matches the pre-stored cell information.

4. The method of claim 2, wherein the link connectivity with the IMS packet data network (PDN) being detected in the second cell comprises:

sending a transmission control protocol (TCP) handshake packet to the PDN; and determining, upon receiving a response to the TCP handshake packet, that the link connectivity with the IMS PDN is detected in the second cell.

5. The method of claim 2, wherein the initiating of the initial registration of the IMS comprises:

restarting a protocol stack of the UE;

re-camping on a network in the second cell;

re-establishing the link connectivity with the IMS PDN; and initiating the initial registration of the IMS after successfully establishing the link connectivity with the IMS PDN.

6. The method of claim 5, wherein the re-camping on the network in the second cell comprises executing, by the UE, detaching and attaching operations of a wireless network in the second cell.

7. The method of claim 5, wherein the re-camping on the network in the second cell comprises executing, by the UE, deregistration and registration operations of a wireless network in the second cell.

8. The method of claim 2, wherein the initiating of the initial registration of the IMS comprises:

re-establishing the link connectivity with the IMS PDN; and initiating the initial registration of the IMS after successfully establishing the link connectivity with the IMS PDN.

9. The method of claim 8, wherein the re-establishing of the link connectivity with the IMS PDN comprises:

sending an activation request for re-establishing the link connectivity with the IMS PDN; and establishing the link connectivity with the IMS PDN successfully after receiving an activation response to the activation request.

10. The method of claim 1, wherein the second cell is a different cell from the first cell.

11. A user equipment (UE) comprising:

a transceiver;

a processor; and memory storing instructions that, when executed by the processor, cause the UE to:

identify a failure of a registration of an IP multimedia subsystem (IMS) in a first cell, identify a second cell satisfies a condition for the registration of the IMS before a waiting time for a next registration of the IMS expires, wherein the waiting time starts due to the failure, initiate an initial registration of the IMS in a second cell before the waiting time for the next registration of the IMS expires, and recover a call service of the UE after the initial registration of the IMS is successful.

12. The UE of claim 11, wherein the condition for the registration of the IMS comprises at least one of:

a network signal strength of the second cell being greater than a preset threshold;

the second cell being a cell that has successfully registered with the IMS before; or a link connectivity with an IMS packet data network (PDN) being detected in the second cell.

13. The UE of claim 12, wherein the memory further comprises the instructions that, when executed by the processor, cause the UE to:

pre-store cell information of a cell that has successfully registered with the IMS before, compare cell information of the second cell with the pre-stored cell information, and determine that the second cell is the cell that has successfully registered with the IMS before when the cell information of the second cell matches the pre-stored cell information.

14. The UE of claim 12, wherein the memory further comprises the instructions that, when executed by the processor, cause the UE to:

send a transmission control protocol (TCP) handshake packet to the PDN; and determine, upon receiving a response to the TCP handshake packet, that the link connectivity with the IMS PDN is detected in the second cell.

15. The UE of claim 12, wherein the memory further comprises the instructions that, when executed by the processor, cause the UE to:

restart a protocol stack of the UE, re-camp on a network in the second cell, re-establish the link connectivity with the IMS PDN, and initiate the initial registration of the IMS after successfully establishing the link connectivity with the IMS PDN.

16. The UE of claim 15, wherein the re-camping on the network in the second cell comprises executing, by the UE, detaching and attaching operations of a wireless network in the second cell.

\* \* \* \* \*